Patented Aug. 25, 1953

2,650,153

UNITED STATES PATENT OFFICE 2,650,153

PROCESS FOR THE PRODUCTION OF AMMONIUM URANIUM FLUORIDE

Amy S. Ellis, Runcorn, and Ronald B. Mooney, Liverpool, England, assignors to Imperial Chemical Industries Limited, a corporation of Great Britain No Drawing. Application December 17, 1943, Serial No. 514,717. In Great Britain January 16, 1942

9 Claims. (Cl. 23—14.5)

This invention relates to improvements in the manufacture of inorganic salts, and more particularly to ammonium uranium fluoride.

It has been proposed to estimate uranium compounds in aqueous solution by reducing them to the uranous condition, and precipitating the tetrafluoride by addition of hydrofluoric acid.

According to the present invention ammonium uranium fluoride is prepared by a process which comprises adding hydrofluoric acid and/or a soluble fluoride to an aqueous solution of a uranous compound containing an ammonium salt, and isolating the resultant precipitate. Preferably the aqueous solution of the uranous compound contains an ammonium salt, e. g. ammonium chloride, in amounts approximately equivalent to the uranous compound.

The presence of the ammonium salt in the solution before the addition of the fluoride ion, either as a soluble fluoride, or as hydrofluoric acid, ensures that on such addition the double salt is precipitated, and not uranium tetrafluoride. The precipitated salt can be separated from the reaction mixture merely by decantation or filtration, and preferably it is then washed and dried.

Ammonium fluoride may be used to precipitate the double salt, or we may use ammonium bifluoride or other fluoride, but we prefer to use hydrofluoric acid, suitably as a concentrated aqueous solution. The acid or fluoride may be added in amounts approximately equivalent to the uranous compound in solution, though excess may be employed if desired to ensure complete precipitation.

The solution of the uranous compound may be obtained in any suitable manner, as for example, by reducing a solution of uranyl nitrate, sulphate, or chloride electrolytically, or by means of nascent hydrogen.

Thus in one form of our invention ammonium diuranate is dissolved in excess aqueous hydrochloric acid and reduced by the addition of granulated zinc, whereby a solution is obtained containing $UCl_4$ and $NH_4Cl$; a solution of hydrofluoric acid, e. g. 40% acid is then added at ordinary temperatures until no more precipitate is formed. The resulting ammonium uranium fluoride which is thereby precipitated as a green solid is then separated by filtration, washed and dried at 100° C. If desired the ammonium uranium fluoride may be further treated, e. g. as described in copending application Serial No. 514,718, filed December 17, 1943. This copending application describes the preparation of uranium tetrafluoride by heating ammonium uranium fluoride.

The following example illustrates but does not limit our invention, all parts being by weight:

Example

Ammonium diuranate was prepared by dissolving 125 parts of sodium uranate in the least possible amount of 36% hydrochloric acid, and precipitating the ammonium salt by addition of aqueous ammonia of specific gravity 0.88, until the solution was alkaline. The resulting ammonium diuranate was filtered and washed with water, and dissolved in 475 parts of 36% hydrochloric acid. 25 parts of granulated zinc were then added whereby reduction was brought about giving a solution containing ammonium chloride and uranium tetrachloride. The solution was filtered and an aqueous solution of hydrofluoric acid (40% HF by weight) added until no more precipitate ($NH_4UF_5, \frac{1}{2}H_2O$) formed. The precipitate was filtered off, washed with water and dried at 100° C. thus being converted to anhydrous fluoride $NH_4UF_5$.

Analysis of the dried product showed a uranium content of 67.2%. The uranium content required for $NH_4UF_5$ is 67.8%.

We claim:

1. A process for the production of an ammonium uranium fluoride which comprises adding an ammonium fluoride to an aqueous solution of a uranous compound containing an ammonium salt, and isolating the resulting precipitate.

2. A process for the production of an ammonium uranium fluoride which comprises adding hydrofluoric acid to an aqueous solution of a uranous compound containing an ammonium salt, and isolating the resulting precipitate.

3. A process for the production of an ammonium uranium fluoride which comprises adding an ammonium fluoride to an aqueous solution of uranous chloride containing an ammonium salt, and isolating the resulting precipitate.

4. A process for the production of an ammonium uranium fluoride which comprises adding hydrofluoric acid to an aqueous solution of uranous chloride containing an ammonium salt, and isolating the resulting precipitate.

5. A process for the production of an ammonium uranium fluoride which comprises adding a compound selected from the group consisting of hydrofluoric acid, ammonium fluoride and ammonium bifluoride to an aqueous solution of a uranous compound containing an ammonium salt, and isolating the resulting precipitate.

6. A process for the production of an ammonium uranium fluoride which comprises adding a compound selected from the group consisting of hydrofluoric acid, ammonium fluoride and ammonium bifluoride to an aqueous solution of a compound selected from the group consisting of uranous sulphate, uranous chloride and uranous nitrate, containing an ammonium salt, and isolating the resulting precipitate.

7. A process for the production of an ammonium uranium fluoride which comprises adding hydrofluoric acid to an aqueous solution of uranous chloride containing ammonium chloride and isolating the resulting precipitate.

8. A process for the production of an ammonium uranium fluoride which comprises adding a compound selected from the group consisting of hydrofluoric acid, ammonium fluoride and ammonium bifluoride to an aqueous solution of a uranous compound containing ammonium chloride, and isolating the resulting precipitate.

9. A process for the production of an ammonium uranium fluoride which comprises adding a compound selected from the group consisting of hydrofluoric acid, ammonium fluoride and ammonium bifluoride to an aqueous solution of a compound selected from the group consisting of uranous sulphate, uranous chloride and uranous nitrate, containing ammonium chloride, and isolating the resulting precipitate.

AMY SMEETON ELLIS NÉE LEAH.
RONALD BARRON MOONEY.

References Cited in the file of this patent

Mellor: "Comprehensive Treatise on Inorganic and Theoretical Chemistry," vol. XII, 1932, page 77; copy in Div. 59.